United States Patent [19]

Lugscheider et al.

[11] Patent Number: 4,606,038

[45] Date of Patent: Aug. 12, 1986

[54] PLANT FOR PRODUCING CALCIUM CARBIDE

[75] Inventors: Walter Lugscheider, Linz; Ernst Riegler, Enns; Ernst Zajicek, Ottensheim, all of Austria

[73] Assignee: SKW Trostberg Aktiengesellschaft, Trostberg, Fed. Rep. of Germany

[21] Appl. No.: 557,354

[22] Filed: Dec. 1, 1983

[30] Foreign Application Priority Data

Dec. 22, 1982 [AT] Austria .................................. 4637/82

[51] Int. Cl.$^4$ .............................................. H05H 1/42
[52] U.S. Cl. ........................................ 373/24; 414/187
[58] Field of Search ..................... 373/18–26; 414/187, 327; 219/121 P

[56] References Cited

U.S. PATENT DOCUMENTS

| | | | |
|---|---|---|---|
| 1,880,012 | 9/1932 | Brassert | 266/221 |
| 3,404,078 | 10/1968 | Goldberger | 204/164 |
| 3,979,500 | 9/1976 | Sheppard et al. | 423/289 |
| 4,022,872 | 5/1977 | Carson et al. | 423/297 |
| 4,154,972 | 5/1979 | Tylko | 373/23 |
| 4,309,170 | 1/1982 | Ward | 432/96 |
| 4,390,773 | 6/1983 | Esser et al. | 373/18 |
| 4,396,421 | 8/1983 | Stift et al. | 373/24 |
| 4,423,512 | 12/1983 | Lugscheider et al. | 373/22 |
| 4,425,659 | 1/1984 | Stenkvist | 373/24 |
| 4,493,088 | 1/1985 | Lugscheider et al. | 373/22 |

FOREIGN PATENT DOCUMENTS

| | | | |
|---|---|---|---|
| 105386 | 9/1897 | Fed. Rep. of Germany. | |
| 386482 | 6/1922 | Fed. Rep. of Germany. | |
| 0386482 | 12/1923 | Fed. Rep. of Germany. | |
| 480540 | 11/1926 | Fed. Rep. of Germany. | |
| 526626 | 1/1928 | Fed. Rep. of Germany. | |
| 1556614 | 2/1968 | Fed. Rep. of Germany | 414/327 |
| 1036208 | 9/1953 | France. | |
| 1068174 | 5/1967 | United Kingdom. | |

Primary Examiner—A. D. Pellinen
Assistant Examiner—Gregory D. Thompson
Attorney, Agent, or Firm—Brumbaugh, Graves, Donohue & Raymond

[57] ABSTRACT

A burden of either or both CaO or CaCO$_3$ and coal is melted and reduced by a plasma torch established between a plasma burner penetrating the upper structure of a furnace and an electrode in the bottom of the furnace to produce CaC$_2$. The burden is supplied to the furnace from above and the CO produced by the reaction flows upwardly through the unreacted burden to pre-heat and pre-reduce it.

7 Claims, 4 Drawing Figures

PLANT FOR PRODUCING CALCIUM CARBIDE

BACKGROUND OF THE INVENTION

The invention relates to a plant for the production of calcium carbide by melting and reducing a burden comprising CaO or CaCO₃, by supplying electric energy to a melting furnace having a melting space with a plasma burner means and supply means for the burden components.

Hitherto, graphite or Soderberg electrodes with large diameters have commonly been used to supply the electric energy. With these electrodes, no freely burning arc was formed, and the heating was effected substantially by resistance heating of the burden. Correspondingly, the temperatures which could be reached in the melting region were relatively low and the time required for melting was correspondingly long.

A method of forming a plasma arc is known from U.S. Pat. No. 3,404,078, in which a fluidized bed of electrically conductive particles constitutes one electrode, and a plasma arc burns between the fluidized bed and a second electrode. for the production of CaC$_2$ a fluidized bed of graphite particles suspended by means of argon is disclosed. Calcium oxide is supplied to the plasma region with an argon carrier gas flow and agglomerates of carbide-coated graphite particles are obtained. To obtain the CaC$_2$, further complex treatment of the solid agglomerates formed is necessary, which is connected with losses of graphite. The degree of reaction of the graphite carbon with the CaO is very low, thus the CaC$_2$ production according to the method disclosed in U.S. Pat. No. 3,404,078 is not economical.

The present invention aims at avoiding the disadvantages described of known methods, and has as its object to provide a plant in which temperatures substantially higher than those occurring with resistance heating are achieved, resulting in a rapid operationally safe melting and a quick and complete reaction between the burden components. The invention further provides a plant, in which the development of the reaction is controlled in an improved manner and in which the uncomplicated preparation of very pure CaC$_2$ is possible.

SUMMARY OF THE INVENTION

According to the invention, these objects are achieved by penetrating the side walls or the vault parts of the melting space by one or a number of plasma burners directed towards an electrode arranged in the bottom part of the melting space, thus forming plasma torches.

By forming these plasma torches, charge materials having various grain sizes, also dustlike charge materials, can be melted and brought to reaction without trouble. In a resistance furnace, only lumpy charge materials could be used.

By using plasma burners, not only the radiation heat of the freely burning torch, which approaches 15,000° C. in its core, but also the convection heat at the point of impact can be utilized and combined with the resistance heating effected by the flow of current through the remaining burden. The carbon monoxide forming during the reaction increases the energy density of the plasma torch and thus further increases the energy yield.

The invention contemplates various embodiments for the construction of the plant.

Suitably, the bottom part of the melting space is flat-conically designed, with a groove for the molten stock surrounding the bottom electrode which extends to the top of the cone.

The vault of the melting space may be provided with an additional supply means for fine-particle coal.

Furthermore, supply channels for dustlike or fine-particle coal may be provided in the plasma burner(s).

According to further preferred embodiments, the melting space is combined with a shaft space. Thus a shaft part having a lesser diameter than that of the melting space can be superposed on the vault part of the melting space. A gas vent is provided in the upper part of the shaft and a charging means for the burden components is provided at the upper end of the shaft in a manner that, when continuously supplying the burden components, a dumping cone of solid burden components is formed from the bottom of the melting space to the gas vent. The lower part of the dumping cone is melted off and the upper part is pre-reduced because the CO forming in the melting space flows therethrough.

It is, however also possible for the melting space to be connected by a connecting channel with a low-shaft furnace forming a separate construction unit and positioned above the melting space. The low-shaft furnace comprises a filling space and a conically widened bottom space. A conveying means, such as a chain conveyor, is provided between the widened bottom space and connecting channel.

In this embodiment, the inner space of the shaft furnace may be designed so as to converge upwardly. In the upper part of the shaft furnace, a supply means for the burden components and a gas vent pipe are provided.

BRIEF DESCRIPTION OF THE DRAWINGS

The plant according to the invention is explained in more detail in the drawings with reference to two exemplary embodiments, wherein.

DESCRIPTION OF THE EXEMPLARY EMBODIMENTS

Figure 1:
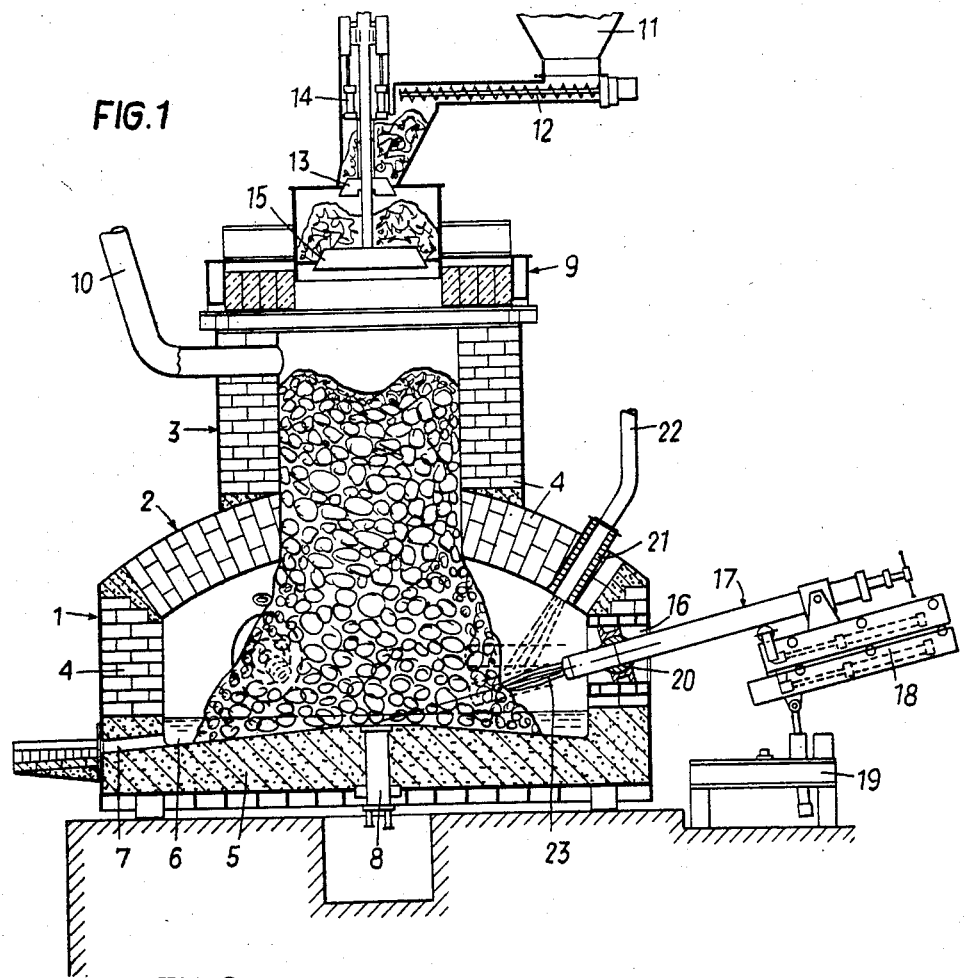
FIG. 1 illustrates a vertical section through a first embodiment of a plant designed according to the invention.

With reference to FIG. 1, a cylindrical furnace body 1, has a vault part 2, which has a recess in its middle, and an upper furnace or a shaft part 3, whose internal diameter coincides with the diameter of the central recess of the vault part. The walls of the furnace body 1, the vault part 2 and the shaft part 3 are lined with refractory bricks 4. The bottom of the container is formed by a graphite ramming mass 5 or graphite bricks. The bottom is designed so as to conically descend outwardly to the walls of the furnace body, whereby an annular groove 6 is formed, which is connected with a discharge channel 7 leading towards to the exterior of the furnace body 1. A bottom electrode 8 is arranged in the elevated middle of the ramming mass 5. The upper furnace or shaft part 3 is closed by a lid 9 so as to be gas-tight; a gas vent 10 is provided in the upper part of the shaft 3.

Figure 2:
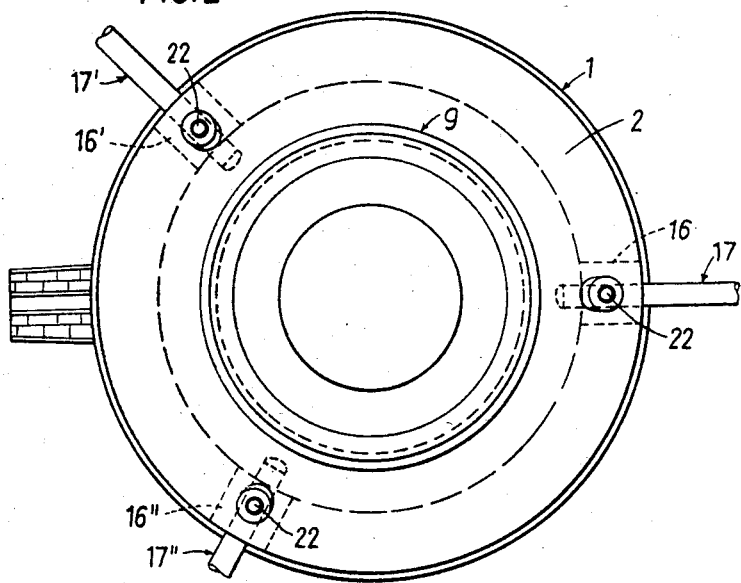
FIG. 2 is a top view of the plant illustrated in FIG. 1.

In the lid 9, a supply means for the burden components is provided, which is comprised of a storage bin 11, a conveyor worm 12 and a dosing means 13 having a hydraulic drive 14 and a closing part 15. As seen more clearly in FIG. 2, the side walls of the furnace body, which define the melting space, have three peripherally distributed, lateral, water-cooled passages 16, 16' and 16" therein for plasma burners 17, 17' and 17" respectively, whose mouths point in the direction of the bottom electrode 8. The plasma burners 17, 17', 17", are mounted on mountings 18 which are supported by trestles 19. With this mechanism, the plasma burners can be displaced in the longitudinal direction and pivoted in any direction within the furnace body 1. In the passages 16, 16', 16", bearing means 20 are provided.

In the vault part 2 of the melting space, further water-cooled passages 21 may be provided, through which the supply pipes 22 are guided, which are directed towards the region of the plasma torches 23. It may be desirable to supply additional fine-particle coal through the supply pipes 22 to the torch region during the process.

Figure 3:
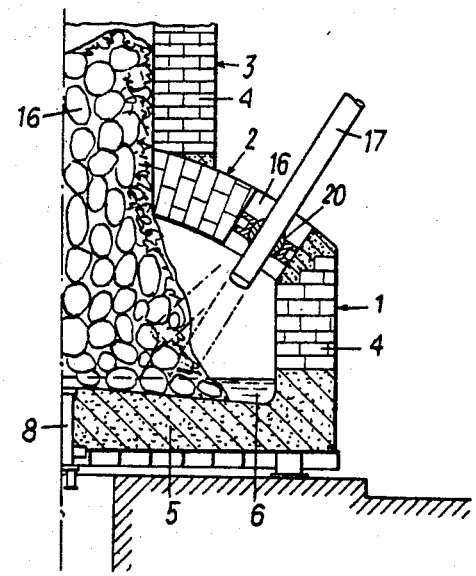
FIG. 3 illustrates a modification of the electrode introduction into the vault of the melting space.

In FIG. 3, a modification of the introduction of the plasma burners 17 is shown, wherein the passages 16 are not provided in the side walls, but in the vault part 2. Otherwise the design is the same as that of FIG. 1.

Figure 4:
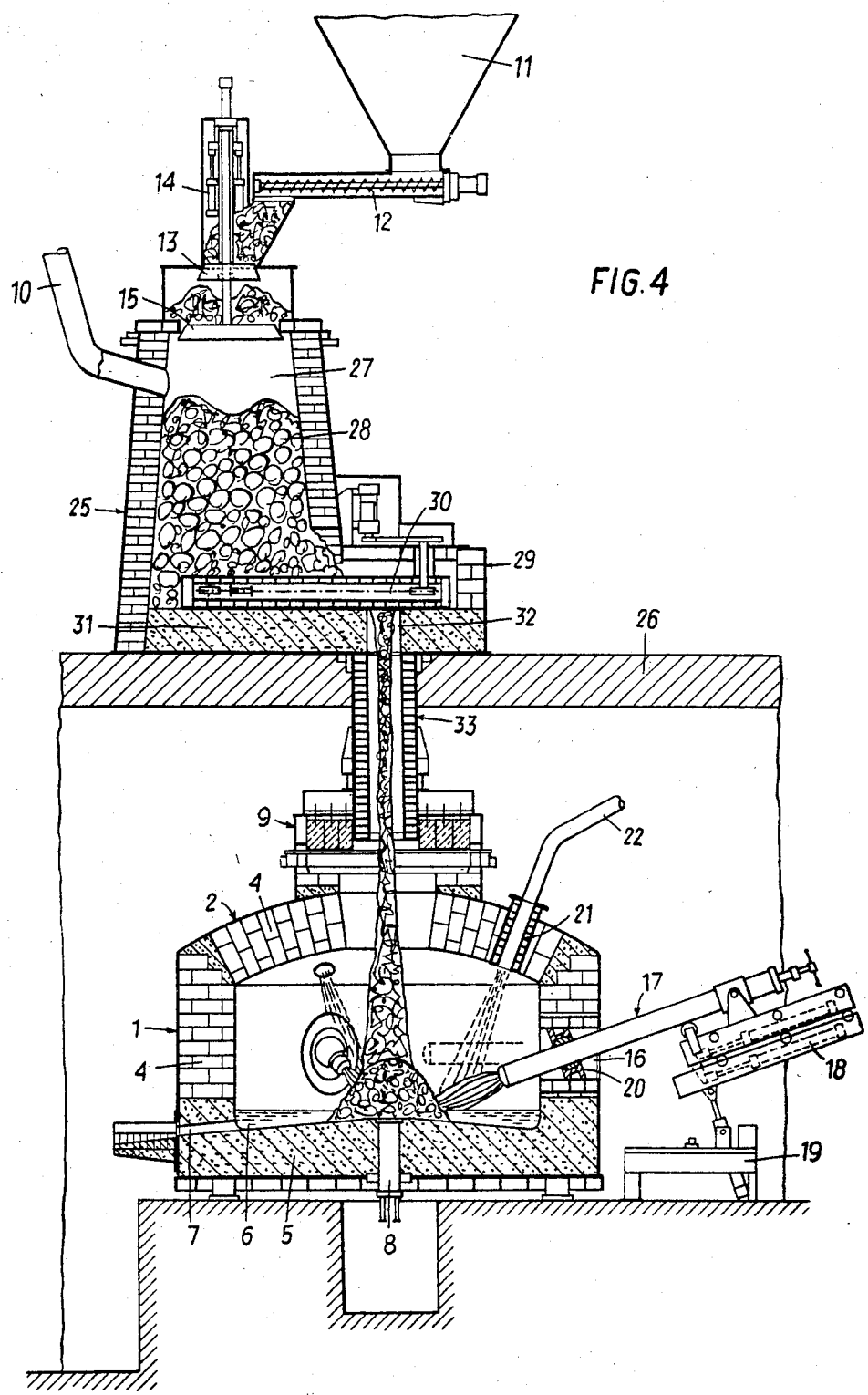
FIG. 4 illustrates a vertical section through an alternative embodiment of a plant according to the invention.

With the modified embodiment according to FIG. 4, the shaft furnace part is completely separated from the melting furnace part. The shaft furnace 25, which corresponds to the shaft part 3 of FIG. 1, is arranged on a carrying construction 26 above the melting furnace or melting space 1. The walls of the shaft furnace are designed so as to converge conically upwardly and form a filling space 27 for the burden 28. The filling space downwardly diverges into a widened bottom part 29, in which a chain conveyor 30 is arranged. The bottom 31 of the shaft furnace, which consists of graphite ramming mass, has an opening 32, which is followed by the vertical connecting channel 33 to the melting space. This connecting channel 33 penetrates the lid 9 of the melting furnace and allows for the introduction of the burden components into the melting space. Otherwise, the furnace body or melting space is designed in the same manner as that shown in FIG. 1.

In the upper part of the shaft furnace, conveying and supply means are arranged which are designed similar to those of the embodiment of FIG. 1, i.e., a storage container 11, a conveyor worm 12, and a dosing means 13 with hydraulic drive 14 and a closing cap 15 are provided.

The plants of the two embodiments function similarly. At first, a small amount of burden is introduced into the melting space, then the plasma torches are ignited and burden is continuously supplied. With the embodiment according to FIGS. 1, 2 and 3, a dumping or standing cone of burden material is maintained approximately up to the height of the vent 10. With the embodiment according to FIG. 4, the standing cone is not maintained in the melting space, but is maintained in the shaft positioned above the melting space, and only as much burden is introduced into the melting space as is transformed there into the liquid state. With both embodiments, it is important that the CO produced flows through the standing cone of burden components, whereby not only a pre-heating, but also a pre-reduction is effected.

What we claim is:

1. A plant for producing calcium by melting and reducing a burden including as components, coal and one or both of CaO and $CaCo_3$ comprising:
    a melting furnace having a melting space defined by a bottom part, side walls and a vault part carried by side walls and having an opening therein,
    at least one plasma burner penetrating said melting furnace into said melting space,
    a bottom electrode disposed in said bottom part, said at least one plasma burner being directed towards said bottom electrode and forming a plasma torch therebetween,
    said bottom part comprising an upper surface in the form of an upwardly extending cone, said bottom electrode extending through said bottom part to the top of said cone, the downwardly diverging surface of said cone meeting said side walls to provide a groove for molten stock surrounding said bottom electrode, and
    means for supplying said burden components into said melting space through said opening in the vault part to said bottom part in the region of said plasma torch to be melted and reduced thereby to produce $CaC_2$ and CO, the CO produced by the reaction of said components in the region of the plasma torch flowing through the unreacted portions of said burden components before they reach said region.

2. A plant as set forth in claim 1, wherein said at least one plasma burner penetrates said side walls.

3. A plant as set forth in claim 1, wherein said at least one plasma burner penetrates said vault part.

4. A plant as set forth in claim 1, further comprising an additional supply means provided in said vault part of said melting space for supplying fine-particle coal.

5. A plant for producing calcium carbide by melting and reducing a burden including as components, coal and one or both of CaO and $CaCO_3$ comprising:
    a melting furnace having a melting space defined by a bottom part, side walls and a vault part carried by said side walls and having an opening therein,
    at least one plasma burner penetrating said melting furnace into said melting space,
    a bottom electrode disposed in said bottom part, said at least one plasma burner being directed towards said bottom electrode and forming a plasma torch therebetween,
    a shaft part with an upper portion having an upper end,
    said shaft having a diameter that is smaller than the diameter of said melting space and being superposed on the vault part of said melting space,
    a gas vent provided in said upper portion of said shaft part, and
    means on said upper end of said shaft part for continuously charging burden components through said shaft part to the bottom of said melting space,
    whereby during the continuous supply of said burden components a cone of solid burden components extending from said bottom of said melting space to said gas vent is formed, the lower part of said burden cone in the region of said plasma torch being melted and the upper part of said burden cone being pre-reduced by CO forming in said melting space and flowing upwardly through said cone upper part.

6. A plant for producing calcium carbide by melting and reducing a burden including as components, coal and one or both of CaO and CaCO$_3$, comprising:
- a melting furnace having a melting space defined by a bottom part, side walls, and a vault part carried by said side walls and having an opening therein,
- at least one plasma burner penetrating said melting furnace into said melting space,
- a bottom electrode disposed in said bottom part, said at least one plasma burner being directed towards said bottom electrode and forming a plasma torch therebetween,
- a shaft furnace having a filling opening at its upper end and conically diverging downwardly towards its bottom end, said shaft furnace being positioned above said melting space,
- a connecting channel extending upwardly from said melting space,
- conveying means provided in said bottom end of said shaft furnace for conveying burden components from said bottom end to said connecting channel, and
- a gas vent adjacent the upper end of the shaft furnace, and means for supplying said burden components comprising charging means provided at the upper end of said shaft furnace.

7. A plant as set forth in claim 6, wherein said conveying means is a chain conveyor.

* * * * *

UNITED STATES PATENT AND TRADEMARK OFFICE
CERTIFICATE OF CORRECTION

PATENT NO. : 4,606,038

DATED : Aug. 12, 1986

INVENTOR(S) : Lugscheider et al.

It is certified that error appears in the above-identified patent and that said Letters Patent is hereby corrected as shown below:

Col. 4, line 1, after "calcium" insert --carbide--.

Signed and Sealed this

Fourth Day of November, 1986

[SEAL]

Attest:

DONALD J. QUIGG

*Attesting Officer*  *Commissioner of Patents and Trademarks*